(12) United States Patent
Kani

(10) Patent No.: US 11,939,452 B2
(45) Date of Patent: Mar. 26, 2024

(54) POLYVINYL ALCOHOL FILM, AND CHEMICAL AGENT PACKAGE

(71) Applicant: Mitsubishi Chemical Corporation, Tokyo (JP)

(72) Inventor: Shouichi Kani, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 582 days.

(21) Appl. No.: 17/147,785

(22) Filed: Jan. 13, 2021

(65) Prior Publication Data

US 2021/0130576 A1 May 6, 2021

Related U.S. Application Data

(63) Continuation of application No. PCT/JP2019/029582, filed on Jul. 29, 2019.

(30) Foreign Application Priority Data

Jul. 31, 2018 (JP) .................................. 2018-143771
Jul. 31, 2018 (JP) .................................. 2018-143772

(51) Int. Cl.
  *B65D 75/28* (2006.01)
  *C08K 5/053* (2006.01)
  *C08K 5/103* (2006.01)
  *C08K 5/53* (2006.01)
  *B65D 65/46* (2006.01)

(52) U.S. Cl.
  CPC .............. *C08K 5/103* (2013.01); *B65D 75/28* (2013.01); *C08K 5/053* (2013.01); *B65D 65/46* (2013.01)

(58) Field of Classification Search
  CPC .. B65D 75/28; B65D 75/30; C08J 5/18; C08J 2329/04; C08F 216/06; C08L 29/04; C08L 2205/02; C08L 2205/025; C08L 2205/03
  USPC ..................................... 428/35.4, 34.1–36.92
  See application file for complete search history.

(56) References Cited

U.S. PATENT DOCUMENTS

| | | | | |
|---|---|---|---|---|
| 5,547,764 A * | 8/1996 | Blais | ..................... | C09D 129/04 428/688 |
| 2003/0215585 A1* | 11/2003 | Bunick | ..................... | B30B 11/34 428/34.1 |
| 2005/0010010 A1* | 1/2005 | Kitamura | ..................... | C08J 5/18 526/330 |
| 2008/0182937 A1* | 7/2008 | Urian | ..................... | C11D 17/042 525/58 |
| 2013/0273277 A1* | 10/2013 | Lee | ..................... | C11D 3/505 428/35.2 |
| 2016/0068787 A1* | 3/2016 | Casella | ..................... | C12N 9/20 428/220 |
| 2016/0102278 A1* | 4/2016 | Labeque | ............... | C11D 17/042 510/513 |
| 2016/0312157 A1* | 10/2016 | Haugaard | ........... | C11D 3/38627 |
| 2016/0326285 A1* | 11/2016 | Mori | ........................... | C08J 5/18 |
| 2016/0369072 A1* | 12/2016 | Yamaguchi | ........... | C08F 116/06 |
| 2017/0259976 A1* | 9/2017 | Lee | ..................... | C08K 3/014 |
| 2018/0029763 A1* | 2/2018 | Nii | ........................... | B65D 75/40 |

FOREIGN PATENT DOCUMENTS

| | | | | |
|---|---|---|---|---|
| EP | 1418196 A1 | 5/2004 | | |
| JP | 49-131240 | 12/1974 | | |
| JP | 51-123257 | 10/1976 | | |
| JP | 09-272771 A | 10/1997 | | |
| JP | 2000-095949 A | 4/2000 | | |
| JP | 2001-072710 | 3/2001 | | |
| JP | 2001072710 A | * 3/2001 | ........... | C08F 218/04 |
| JP | 2001-329130 | 11/2001 | | |
| JP | 2003-261649 A | 9/2003 | | |
| JP | 2003-261694 | 9/2003 | | |
| JP | 2008-184614 | 8/2008 | | |
| JP | 2012-197389 A | 10/2012 | | |

OTHER PUBLICATIONS

Office Action issued in JP Patent Application No. 2019-541369, dated Aug. 30, 2022, translation.
Office Action dated Jul. 18, 2023 issued in Japanese Patent Application No. 2022-165190, with English machine translation.
Office Action issued in Chinese Patent Application No. 201980047172.5, dated Aug. 29, 2022, translation.
ISR issued in WIPO Patent Application No. PCT/JP2019/029582, dated Sep. 10, 2019, English translation.
IPRP issued in WIPO Patent Application No. PCT/JP2019/029582, dated Feb. 2, 2021, English translation.
European Search Report issued in EP Patent Application No. 19843905.1, dated Sep. 1, 2021.

* cited by examiner

*Primary Examiner* — Michael C Romanowski
(74) *Attorney, Agent, or Firm* — GREENBLUM & BERNSTEIN, P.L.C.

(57) ABSTRACT

A polyvinyl alcohol film is provided, which is highly transparent, and excellent in antistatic property and cold-water solubility. The polyvinyl alcohol film contains: (A) a polyvinyl alcohol resin; and (B) an ester of a C2 to C4 fatty acid (b1) and a polyhydric alcohol (b2); wherein the ester (B) is present in an amount of 1 to 4,000 ppm.

12 Claims, No Drawings

POLYVINYL ALCOHOL FILM, AND CHEMICAL AGENT PACKAGE

RELATED APPLICATION

This application is a continuation of International Application No. PCT/JP2019/029582, filed on Jul. 29, 2019, which claims priority to Japanese Patent Application No. 2018-143771 and 2018-143772, filed on Jul. 31, 2018, the entire contents of each of which being hereby incorporated by reference.

TECHNICAL FIELD

The present disclosure relates to a polyvinyl alcohol film. More specifically, the present disclosure relates to a polyvinyl alcohol film which is highly soluble in cold water, highly transparent, and excellent in antistatic property, and to a chemical agent package produced by using the polyvinyl alcohol film.

BACKGROUND ART

Conventionally, polyvinyl alcohol films are produced by properly adjusting the saponification degree of a polyvinyl alcohol resin and/or introducing an anionic functional group into a polyvinyl alcohol molecular chain (modifying a polyvinyl alcohol molecular chain with an anionic functional group) for use as water-soluble films which are soluble in water. Specifically, the polyvinyl alcohol films are used for applications for packaging chemical agents such as agricultural chemicals and detergents (unit package applications), (water pressure) transfer films, sanitary supplies such as sanitary napkins and disposable diapers, waste disposal supplies such as ostomy bags, medical supplies such as blood-absorbing sheets, and temporary base materials for seeding sheets, seeding tapes, and embroidery bases.

Of these applications, the unit package applications for chemical agents such as agricultural chemicals and detergents are advantageous in that the chemical agents can be used without the need for measuring the chemical agent amount and without possibility of dirtying hands. In particular, unit package applications for liquid products such as liquid detergents are expanding.

In the unit package applications, highly-transparent water-soluble films and water-soluble films excellent in printability are recently required from the viewpoint of design feasibility. Therefore, the water-soluble films are required to have a wider variety of physical properties than the conventional water-soluble films. For example, the water-soluble films are required to be excellent in antistatic property so as to prevent adhesion of foreign matter such as dust and particles to a film surface, which may otherwise cause printing failures during the printing.

Known examples of the polyvinyl alcohol films to be used for the water-soluble film applications include a water-soluble film (see, for example, PTL 1) prepared by blending 100 parts by weight of a polyvinyl alcohol, 5 to 30 parts by weight of a plasticizer, 1 to 10 parts by weight of starch, and 0.01 to 2 parts by weight of a surfactant, and a polyvinyl alcohol film (see, for example, PTL 2) formed from a resin composition containing two or more types of polyvinyl alcohols having different saponification degrees.

RELATED ART DOCUMENTS

Patent Documents

PTL 1: JP-A-2001-329130
PTL 2: JP-A-2003-261694

SUMMARY

The polyvinyl alcohol film disclosed in PTL 1 is excellent in water solubility, antiblocking property, and impact rupture strength. The polyvinyl alcohol film disclosed in PTL 2 is excellent in cold-water solubility and durability. These polyvinyl alcohol films are both advantageous as chemical agent package films. To satisfy recent requirements for addition of higher values to the chemical agent packages, it is desirable to improve the transparency and the antistatic property of the polyvinyl alcohol films particularly from the viewpoint of design feasibility.

In view of the foregoing, the present disclosure provides a polyvinyl alcohol film which is highly soluble in cold water, highly transparent, and excellent in antistatic property.

The inventor conducted intensive studies in view of the foregoing. As a result, the inventor unexpectedly found that, where a polyvinyl alcohol film contains an ester compound of a lower fatty acid and a polyhydric alcohol in a much smaller amount as compared with the amounts of common additives added to the polyvinyl alcohol films, the aforementioned object can be achieved.

The present disclosure has the following features:

[1] A polyvinyl alcohol film containing: (A) a polyvinyl alcohol resin; and (B) an ester of a C2 to C4 fatty acid (b1) and a polyhydric alcohol (b2), wherein the ester (B) is present in an amount of 1 to 4,000 ppm.

[2] In the polyvinyl alcohol film described in Item [1], the polyvinyl alcohol resin (A) is a modified polyvinyl alcohol resin.

[3] In the polyvinyl alcohol film described in Item [1], the polyvinyl alcohol resin (A) includes two or more types of polyvinyl alcohol resins which are different in at least one selected from the group consisting of saponification degree, viscosity, modifying group, and modification degree.

[4] In the polyvinyl alcohol film described in Item [2], the modified polyvinyl alcohol resin is a carboxyl-modified polyvinyl alcohol resin.

[5] In the polyvinyl alcohol film described in Item [3], the two or more types of polyvinyl alcohol resins include an unmodified polyvinyl alcohol resin and a modified polyvinyl alcohol resin.

[6] In the polyvinyl alcohol film described in Item [5], the unmodified polyvinyl alcohol resin and the modified polyvinyl alcohol resin are present in a weight ratio of (unmodified polyvinyl alcohol resin)/(modified polyvinyl alcohol resin)=1/99 to 99/1.

[7] In the polyvinyl alcohol film described in any of Items [1] to [6], the polyhydric alcohol (b2) is a C2 to C6 polyhydric alcohol.

[8] The polyvinyl alcohol film described in any of Items [1] to [7] further contains a plasticizer (C).

[9] In the polyvinyl alcohol film described in Item [8], the ester (B) and the plasticizer (C) are present in a weight ratio (B)/(C) of 0.00001 to 0.015.

[10] In the polyvinyl alcohol film described in any of Items [1] to [9], the ester (B) is an acetic acid ester of glycerin.

[11] The polyvinyl alcohol film described in any of Items [1] to [9] is a water-soluble film.

[12] A chemical agent package including a package bag formed from the polyvinyl alcohol film described in any of Items [1] to [11], and a chemical agent packaged in the package bag.

[13] In the chemical agent package described in Item [12], the chemical agent is a detergent.

[14] In the chemical agent package described in Item [13], the detergent is a liquid detergent.

The polyvinyl alcohol film of the present disclosure is highly transparent, and excellent in antistatic property and cold-water solubility. Where the polyvinyl alcohol film of the present disclosure is used for the chemical agent package, the package is excellent in design feasibility and water solubility.

DESCRIPTION OF EMBODIMENTS

The present disclosure will hereinafter be described specifically.

The polyvinyl alcohol film of the present disclosure is required to contain a polyvinyl alcohol resin (A), and 1 to 4,000 ppm of an ester (B) of a C2 to C4 fatty acid (b1) and a polyhydric alcohol.

The polyvinyl alcohol resin (A) is preferably a modified polyvinyl alcohol resin, or is preferably a polyvinyl alcohol resin including two or more types of polyvinyl alcohol resins which are different in at least one selected from the group consisting of saponification degree, viscosity, modifying group, and modification degree.

Hereinafter, the term "polyvinyl alcohol" is sometimes abbreviated as PVA, and the expression "a film formed from the polyvinyl alcohol resin" is referred to simply as PVA film. Further, the expression "the polyvinyl alcohol resin including two or more types of polyvinyl alcohol resins which are different in at least one selected from the group consisting of saponification degree, viscosity, modifying group, and modification degree" is sometimes referred to simply as the PVA resin including two or more types of PVA resins. The expression "the ester (B) of the C2 to C4 fatty acid (b1) and the polyhydric alcohol" is sometimes referred to simply as the polyhydric alcohol-lower fatty acid ester (B). Further, the term "water-soluble film" means a film which is soluble in water at an ordinary temperature (at about 20° C.)

The amount of the polyhydric alcohol-lower fatty acid ester (B) contained in the PVA film is quantitatively measured by a gas chromatograph/mass spectrometry (GC/MS) including a dynamic head space device.

Specifically, the polyhydric alcohol-lower fatty acid ester is vaporized from a film sample (about 5 mg) at 120° C. for 30 minutes by means of the dynamic head space device. Then, a gas component trapped by a condenser is identified and quantitatively analyzed by the GC/MS apparatus. The polyhydric alcohol-lower fatty acid ester is identified in a GC MS spectrum, and the vaporized amount of the polyhydric alcohol-lower fatty acid ester is determined from the area of an abundance intensity peak observed by the GC based on a calibration line prepared for the polyhydric alcohol-lower fatty acid ester component. The vaporized amount thus determined is converted based on the weight of the film sample used for the analysis. Thus, the amount of the polyhydric alcohol-lower fatty acid ester (B) contained in the PVA film is determined.

Where two or more types of polyhydric alcohol-lower fatty acid esters are contained as the polyhydric alcohol-lower fatty acid ester (B), the sum of the amounts of the polyhydric alcohol-lower fatty acid esters each determined in the aforementioned manner is calculated as the amount of the polyhydric alcohol-lower fatty acid ester (B).

The amount of the polyhydric alcohol-lower fatty acid ester (B) contained in the PVA film is required to be to 4,000 ppm, and is preferably 10 to 2,000 ppm, particularly preferably 50 to 1,500 ppm. If the amount of the polyhydric alcohol-lower fatty acid ester (B) is less than the lower limit, it will be impossible to sufficiently ensure the antistatic property and to provide a transparency-improving effect because of an insufficient internal haze-reducing effect. If the amount of the polyhydric alcohol-lower fatty acid ester (B) is greater than the upper limit, on the other hand, the PVA film will fail to satisfy the requirement for the transparency because of its higher internal haze.

Here, the internal haze is an evaluation value for the light scattering property of the film determined while excluding a light scattering factor attributable to surface scattering due to surface irregularities, and is influenced by a PVA crystalline state and a dispersion state of additives having different refractive indexes. In general, the internal haze is used as an index of film transparency, and the internal transparency of the film is increased as the internal haze value decreases.

In the present disclosure, it is considered that the polyhydric alcohol-lower fatty acid ester (B) is liable to migrate to the surface of the PVA film and, therefore, the surface resistivity of the PVA film can be reduced by addition of a small amount of the polyhydric alcohol-lower fatty acid ester (B), thereby preventing the electrification of the film to ensure the dust adhesion preventing effect.

On the other hand, it is also considered that the addition of a small amount of the polyhydric alcohol-lower fatty acid ester (B) in the PVA film containing a plasticizer provides an auxiliary plasticizing effect for the PVA resin and the plasticizer to reduce the PVA crystal size, thereby improving the transparency of the film.

In the present disclosure, the polyhydric alcohol-lower fatty acid ester (B) is blended in a very small amount within the specific range, whereby the PVA film is excellent with its transparency and antistatic property well-balanced.

<PVA Resin (A)>

First, the PVA resin (A) to be used in the present disclosure will be described.

Examples of the PVA resin (A) to be used in the present disclosure include an unmodified PVA resin and a modified PVA resin. The PVA resin (A) may be a single type of PVA resin selected from the group consisting of the unmodified PVA resin and the modified PVA resin, or may be a PVA resin including two or more types of PVA resins. Particularly, a modified PVA resin including one or more types of modified PVA resins, and a PVA resin including two or more types of PVA resins which are different in at least one selected from saponification degree, viscosity, modifying group, and modification degree are preferred. Specific examples of the PVA resin including the two or more types of PVA resins include a PVA resin including two or more types of unmodified PVA resins, a PVA resin including two or more types of modified PVA resins, and a PVA resin including two or more types of unmodified PVA resin and modified PVA resin in combination. Particularly, the PVA resin (A) preferably includes an unmodified PVA resin and a modified PVA resin.

The unmodified PVA resin is prepared by polymerizing a vinyl ester compound and saponifying the resulting polyvinyl ester resin, and mainly contains a vinyl alcohol structural unit. The unmodified PVA resin contains the vinyl alcohol structural unit in a proportion corresponding to a saponification degree, and further contains a vinyl ester structural unit left unsaponified.

Examples of the vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Particularly, vinyl acetate is preferably used as the vinyl ester compound. The aforementioned vinyl ester compounds may be used alone or in combination.

A known polymerization method such as solution polymerization method, emulsion polymerization method or suspension polymerization method may be used for polymerization of the vinyl ester compound. A solution polymerization method using an alcohol such as methanol, ethanol or isopropyl alcohol as a solvent is typically employed.

A polymerization catalyst may be properly selected from known polymerization catalysts including azo catalysts such as azobisisobutyronitrile, and peroxide catalysts such as acetyl peroxide, benzoyl peroxide, and lauroyl peroxide according to the polymerization method. The polymerization reaction temperature may be selected from a range between about 50° C. and the boiling point of the solvent.

The saponification may be achieved by a known method. Typically, the resulting polymer is dissolved in an alcohol, and saponified in the presence of a saponification catalyst. Examples of the alcohol include methanol, ethanol, and butanol. The concentration of the polymer in the alcohol may be selected from a range between 20 and 50 wt. % from the viewpoint of solubility.

Usable examples of the saponification catalyst include alkali catalysts including hydroxides and alcoholates of alkali metals such as sodium hydroxide, potassium hydroxide, sodium methylate, sodium ethylate, and potassium methylate, and acid catalysts. The saponification catalyst is preferably used in an amount of to 100 mmol equivalents relative to the vinyl ester compound.

The modified PVA resin is prepared by polymerizing a vinyl ester compound and saponifying the resulting polyvinyl ester resin to prepare a resin mainly containing a vinyl alcohol structural unit, and introducing a modifying group into the resin through copolymerization, post reaction or the like. The modified PVA resin contains the vinyl alcohol structural unit in a proportion corresponding to the saponification degree, and further contains a vinyl ester structural unit left unsaponified, and an unsaturated monomer structural unit introduced by the copolymerization or a structural unit introduced by the post reaction.

Examples of the vinyl ester compound for the modified PVA resin include those described above for the unmodified PVA resin.

Examples of the unsaturated monomer to be copolymerized with the vinyl ester monomer for use in the preparation of the modified PVA resin by the copolymerization (copolymerization-modified PVA resin) include: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, and salts, monoesters, and dialkyl esters of these unsaturated acids; nitriles such as acrylonitrile and methacrylonitrile; amides such as acrylamide and methacrylamide; olefin sulfonic acids such as ethylenesulfonic acid, allylsulfonic acid, and methallylsulfonic acid, and salts of these olefin sulfonic acids; alkyl vinyl ethers; N-acrylamide methyl trimethylammonium chloride, allyltrimethylammonium chloride, dimethylallyl vinyl ketone, N-vinylpyrrolidone, vinyl chloride, and vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth) acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, and polyoxypropylene vinylamine; and hydroxyl-containing α-olefins such as 3-buten-1-ol, 4-penten-1-ol, and 5-hexen-1-ol, and acylation products and other derivatives of these hydroxyl-containing α-olefins.

Examples of the modified PVA resin prepared by the post reaction (post-modified PVA resin) include modified PVA resin containing an acetoacetyl group introduced by a reaction with a diketene, modified PVA resin containing a polyalkylene oxide group introduced by a reaction with ethylene oxide, modified PVA resin containing a hydroxyalkyl group introduced by a reaction with an epoxy compound, and modified PVA resin prepared by allowing a PVA resin to react with an aldehyde compound having a functional group by esterification, acetalization, urethanization, etherification, grafting, phosphoric acid esterification, oxyalkylenation, or the like.

The modified PVA resin preferably has a primary hydroxyl group in its side chain, and the number of primary hydroxyl groups in the side chain is typically 1 to 5, preferably 1 to 2, particularly preferably 1. Further, the modified PVA resin preferably has a secondary hydroxyl group in addition to the primary hydroxyl group. Examples of such a modified PVA resin include modified PVA resin having a hydroxyalkyl group in its side chain, and modified PVA resin having a 1,2-diol structural unit in its side chain. The modified PVA resin having the 1,2-diol structural unit in its side chain may be prepared, for example, by: (i) a method in which a copolymer of vinyl acetate and 3,4-diacetoxy-1-butene is saponified; (ii) a method in which a copolymer of vinyl acetate and vinyl ethylene carbonate is saponified and decarbonated; (iii) a method in which a copolymer of vinyl acetate and 2,2-dialkyl-4-vinyl-1,3-dioxolane is saponified and deketalized; and (iv) a method in which a copolymer of vinyl acetate and glycerin monoallyl ether is saponified.

Exemplary methods for the copolymerization of the vinyl ester compound and the unsaturated monomer copolymerizable with the vinyl ester compound include those described above for the preparation of the unmodified PVA resin, and a solution polymerization method using an alcohol is typically used. A polymerization catalyst, a saponification method, a saponification catalyst, and the like may be properly selected from those described above for the preparation of the unmodified PVA resin.

The modified PVA resin to be used in the present disclosure is preferably an anionic group-modified PVA resin from the viewpoint of the solubility. Exemplary anionic groups for the anionic group-modified PVA resin include carboxyl group, sulfonic acid group, and phosphoric acid group. For chemical resistance and long-term stability, the carboxyl group and the sulfonic acid group are preferred, and the carboxyl group is particularly preferred.

A carboxyl-modified PVA resin as the modified PVA resin may be prepared by any method. Examples of the preparation method include: (I) a method in which a carboxyl-containing unsaturated monomer and a vinyl ester compound are copolymerized and then the resulting copolymer is saponified; and (II) a method in which a vinyl ester compound is polymerized in the presence of a carboxyl-containing alcohol, aldehyde or thiol as a chain transfer agent and the resulting polymer is saponified.

Examples of the vinyl ester compound to be used in the method (I) or (II) include those described above, and vinyl acetate is preferably used.

Examples of the carboxyl-containing unsaturated monomer to be used in the method (I) include ethylenically unsaturated dicarboxylic acids (maleic acid, fumaric acid, itaconic acid, and the like), ethylenically unsaturated dicarboxylic acid monoesters (monoalkyl maleates, monoalkyl fumarates, monoalkyl itaconates, and the like), ethylenically unsaturated dicarboxylic acid diesters (dialkyl maleates, dialkyl fumarates, dialkyl itaconates, and the like) which need conversion to carboxyl groups by hydrolysis in the saponification of the copolymer, ethylenically unsaturated carboxylic anhydrides (maleic anhydride, itaconic anhydride, and the like), ethylenically unsaturated monocarboxylic acids ((meth)acrylic acid, crotonic acid, and the like), and salts of these compounds. Of these, maleic acid, monoalkyl maleates, dialkyl maleates, maleic acid salts, maleic anhydride, itaconic acid, monoalkyl itaconates, dialkyl itaconates, (meth)acrylic acid, and the like are preferred. Further, maleic acid, monoalkyl maleates, dialkyl maleates, maleic acid salts, and maleic anhydride are more preferred, and monoalkyl maleates are particularly preferred. These may be used alone or in combination.

In the method (II), the chain transfer agent is preferably used. A thiol compound having a greater chain transfer effect is typically used as the chain transfer agent. Examples of the thiol compound include the following compounds and salts of these compounds, which may be used alone or in combination.

$$HS\text{---}(CH_2)_n\text{---}COOH \tag{1}$$

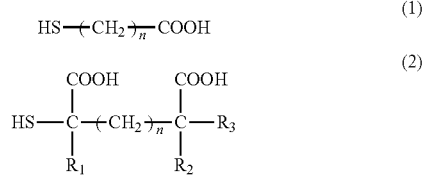

(2)

In the above general formulae (1) and (2), n is an integer of 0 to 5, and $R_1$, $R_2$, and $R_3$ are each a hydrogen atom or a lower alkyl group (which may have a substituent).

(3)

In the above general formula (3), n is an integer of 0 to 20.

Specific examples of the thiol compounds include mercaptoacetic acid, 2-mercaptopropionic acid, 3-mercaptopropionic acid, and 2-mercaptostearic acid.

The carboxyl-containing unsaturated monomer and the vinyl ester compound may be copolymerized with some other common monomer, as long as the water solubility is not impaired. Examples of the common monomer include alkyl esters of ethylenically unsaturated carboxylic acids, allyl esters of saturated carboxylic acids, α-olefins, alkyl vinyl ethers, alkyl allyl ethers, (meth)acrylamide, (meth) acrylonitrile, styrene, and vinyl chloride.

The preparation method for the carboxyl-modified PVA resin is not limited to the aforementioned methods. For example, a polyvinyl alcohol (a partially saponified product or a completely saponified product) may be allowed to post-react with a carboxyl-containing compound, such as dicarboxylic acid, aldehyde carboxylic acid or hydroxycarboxylic acid, having a functional group reactive with a hydroxyl group.

Exemplary methods for the preparation of the sulfonic acid-modified PVA resin include: a method in which the vinyl ester compound is copolymerized with a comonomer such as vinylsulfonic acid, styrenesulfonic acid, allylsulfonic acid, methallylsulfonic acid or 2-acrylamido-2-methylpropanesulfonic acid, and the resulting copolymer is saponified; and a method in which vinylsulfonic acid or its salt, or 2-acrylamido-2-methylpropanesulfonic acid or its salt is introduced into the PVA by Michael addition.

In the present disclosure, the PVA resin (A) is preferably contained as a major component for the PVA film, and the modified PVA resin is more preferably contained as the major component for the PVA film from the viewpoint of the film properties (e.g., solubility and mechanical physical properties). The term "major component" herein means a component which influences the fundamental physical properties of the material. The amount of the PVA resin (A) contained in the PVA film is preferably not less than 50 wt. %, particularly preferably not less than 55 wt. %, more preferably not less than 60 wt. %. If the amount of the PVA resin (A) is excessively small, the film tends to have a lower water solubility and poorer physical properties. The upper limit of the amount of the PVA resin (A) is typically not greater than 99 wt. %, preferably not greater than 95 wt. %, particularly preferably not greater than 90 wt. %, from the viewpoint of the long-term shape stability of a liquid detergent package produced by using the PVA film.

The PVA resin (A) may contain a single type of PVA resin selected from the unmodified PVA resin and the modified PVA resin, or may contain two or more types of PVA resins.

In the present disclosure, from the viewpoint of the long-term water solubility of the PVA film, at least one of the two or more types of PVA resins contained in the PVA resin (A) is preferably the modified PVA resin, more preferably the anionic group-modified PVA resin, particularly preferably the carboxyl-modified PVA resin.

From the viewpoint of the strength of the film, the PVA resin (A) preferably contains the unmodified PVA resin and the modified PVA resin, particularly preferably the unmodified PVA resin and the anionic-group modified PVA resin, more preferably the unmodified PVA resin and the carboxyl-modified PVA resin.

Where the PVA resin containing two or more types of PVA resins contains the unmodified PVA resin and the modified PVA resin, the weight ratio (unmodified PVA resin/modified PVA resin) of the unmodified PVA resin to the modified PVA resin is preferably 1/99 to 99/1, particularly preferably 5/95 to 95/5, more preferably 10/90 to 90/10.

From the viewpoint of the water solubility, the water sealability, and other physical properties of the film, the weight ratio (unmodified PVA resin/modified PVA resin) is preferably 5/95 to 40/60, particularly 6/94 to 30/70, more preferably 7/93 to 20/80. If the proportion of the unmodified PVA resin is excessively small, the water sealability tends to be poorer. If the proportion of the modified PVA resin is excessively small, the solubility tends to be lower.

The PVA resin (A) to be used in the present disclosure preferably has an average saponification degree of not lower than 80 mol %, particularly preferably 85 to 99 mol %, more preferably 90 to 98 mol %. If the average saponification degree of the PVA resin (A) is excessively low, the PVA film tends to have a lower water solubility. If the average saponification degree of the PVA resin (A) is excessively high, the PVA film also tends to have a lower water solubility.

The PVA resin (A) to be used in the present disclosure preferably has a 4 wt. % aqueous solution viscosity of 10 to 50 mPa·s, particularly preferably 15 to 45 mPa·s, more preferably 20 to 40 mPa·s, as measured at 20° C. If the viscosity of the PVA resin (A) is excessively low, the PVA film as the packaging material tends to have a lower mechanical strength. If the viscosity of the PVA resin (A) is excessively high, the aqueous solution viscosity tends to be higher during the film formation, thereby reducing the productivity of the film.

The unmodified PVA resin to be used in the present disclosure preferably has an average saponification degree of not lower than 80 mol %, particularly preferably 82 to 99 mol %, more preferably 85 to 90 mol %. If the average saponification degree of the unmodified PVA resin is excessively low, the PVA film tends to have a lower water solubility. If the average saponification degree of the unmodified PVA resin is excessively high, the PVA film also tends to have a lower water solubility.

The unmodified PVA resin to be used in the present disclosure preferably has a 4 wt. % aqueous solution viscosity of 10 to 50 mPa·s, particularly preferably 15 to 45 mPa·s, more preferably 20 to 40 mPa·s, as measured at 20° C. If the viscosity of the unmodified PVA resin is excessively low, the PVA film as the packaging material tends to have a lower mechanical strength. If the viscosity of the unmodified PVA resin is excessively high, the aqueous solution viscosity tends to be higher during the film formation, thereby reducing the productivity of the film.

The modified PVA resin to be used in the present disclosure preferably has an average saponification degree of not lower than 80 mol %, particularly preferably 85 to m99.9 mol %, more preferably 90 to 99.0 mol % If the average saponification degree of the modified PVA resin is excessively low, the water solubility of the PVA film tends to be reduced over time depending on the pH of a chemical agent to be packaged with the PVA film. If the average saponification degree of the modified PVA resin is excessively high, the water solubility of the PVA film tends to be significantly reduced due to thermal history experienced during the film formation.

Where the anionic group-modified PVA resin is used as the modified PVA resin, the anionic group-modified PVA resin preferably has an average saponification degree of not lower than 85 mol %, particularly preferably 88 to 99.9 mol %, more preferably 90 to 99.5 mol %, especially preferably 90 to 99.0 mol %.

The modified PVA resin to be used in the present disclosure preferably has a 4 wt. % aqueous solution viscosity of 10 to 50 mPa·s, particularly preferably 15 to 45 mPa·s, more preferably 20 to 40 mPa·s, as measured at 20° C. If the viscosity of the modified PVA resin is excessively low, the PVA film as the packaging material tends to have a lower mechanical strength. If the viscosity of the modified PVA resin is excessively high, the aqueous solution viscosity tends to be higher during the film formation, thereby reducing the productivity of the film.

The modified PVA resin to be used in the present disclosure preferably has a modification degree of 1 to 20 mol %, more preferably 1.5 to 15 mol %, particularly preferably 2 to 12 mol %. If the modification degree of the modified PVA resin is excessively low, the PVA film tends to have a lower water solubility. If the modification degree of the modified PVA resin is excessively high, the PVA resin tends to have a lower productivity and a poorer biodegradability. Further, the PVA film is liable to suffer from blocking.

Where the anionic group-modified PVA resin is used as the modified PVA resin in the present disclosure, the anionic group-modified PVA resin preferably has a modification degree of 1 to 10 mol %, more preferably 1.5 to 9 mol %, particularly preferably 2 to 8 mol %. If the modification degree of the anionic group-modified PVA resin is excessively low, the PVA film tends to have a lower water solubility. If the modification degree of the anionic group-modified PVA resin is excessively high, the PVA resin tends to have a lower productivity and a poorer biodegradability. Further, the PVA film is liable to suffer from the blocking.

Where the PVA resin contains the modified PVA resin and the unmodified PVA resin, the unmodified PVA resin preferably has a 4 wt. % aqueous solution viscosity of 5 to mPa·s, particularly preferably 10 to 45 mPa·s, more preferably 12 to 40 mPa·s, especially preferably 15 to 35 mPa·s, as measured at 20° C. If the viscosity of the unmodified PVA resin is excessively low, the PVA film as the packaging material tends to have a lower mechanical strength. If the viscosity of the unmodified PVA resin is excessively high, the aqueous solution viscosity tends to be higher during the film formation, thereby reducing the productivity of the film.

The average saponification degree described above is measured in conformity with JIS K6726 3.5, and the 4 wt. % aqueous solution viscosity is measured in conformity with JIS K6726 3.11.2.

<Polyhydric Alcohol-Lower Fatty Acid Ester (B)>

The polyhydric alcohol-lower fatty acid ester (B) to be used in the present disclosure is an ester of a C2 to C4 fatty acid (b1) and a polyhydric alcohol (b2), wherein the C2 to C4 fatty acid (b1) is bonded to at least one of the hydroxyl groups of the polyhydric alcohol (b2) to form an ester bond.

In the present disclosure, the number of the carbons of the fatty acid (b1), the number of the carbons and the number of the hydroxyl groups of the polyhydric alcohol (b2), and the number of the ester bonds, the number of the hydroxyl groups, and the ratio of the ester bond number to the hydroxyl group number of the polyhydric alcohol-lower fatty acid ester (B) are properly controlled to provide the transparency and antistatic property-improving effects for the PVA film.

Specific examples of the C2 to C4 fatty acid (b1) include saturated acids such as acetic acid, propionic acid, butyric acid (n-butyric acid), and isobutyric acid (2-methylpropionic acid), and unsaturated fatty acids such as crotonic acid.

From the viewpoint of the water solubility of the polyhydric alcohol-lower fatty acid ester (B), the C2 to C4 fatty acid (b1) preferably has a carbon number of 2 to 3, and is more preferably a saturated fatty acid. Particularly, acetic acid or propionic acid having a carbon number of 2 or 3 is preferred, and acetic acid having a carbon number of 2 is most preferred from the viewpoint of the water solubility of the polyhydric alcohol-lower fatty acid ester (B) and the auxiliary plasticizing effect for a plasticizer. If the carbon number of the fatty acid is 5 or greater, the polyhydric alcohol-lower fatty acid ester (B) disadvantageously tends to have a lower water solubility, thereby suffering from phase separation during the film formation.

In the present disclosure, the polyhydric alcohol (b2) is preferably an aliphatic polyhydric alcohol, particularly preferably a C2 to C6 polyhydric alcohol.

Specific examples of the C2 to C6 polyhydric alcohol include: C2 polyhydric alcohols such as ethylene glycol (1,2-ethanediol); C3 polyhydric alcohols such as propylene glycol (1,2-propanediol), 1,3-propanediol, and glycerin (1,2,3-propanetriol); C4 polyhydric alcohols such as 1,2-butanediol, 1,3-butanediol, 1,4-butanediol, 2,3-butanediol, 1,2,3-butanetriol, 1,2,4-butanetriol, erythritol (1,2,3,4-butanetetraol), and threitol; C5 polyhydric alcohols such as 1,2-pentanediol, 1,5-pentanediol, 2,4-pentanediol, 1,2,5-pentanetriol, pentaerythritol, neopentyl glycol, xylitol, arabitol, and fucitol; and C6 polyhydric alcohols such as 1,2-hexanediol, 1,6-hexanediol, 1,2,6-hexanetriol, trimethylolpropane, glucose, fructose, mannitol, sorbitol, and inositol.

The C2 to C6 polyhydric alcohol preferably has a carbon number of 2 to 3 from the viewpoint of the water solubility of the polyhydric alcohol-lower fatty acid ester (B). If the carbon number of the polyhydric alcohol (b2) is excessively great, the polyhydric alcohol-lower fatty acid ester (B) disadvantageously tends to have a lower water solubility, thereby suffering from phase separation during the film formation.

The number of the hydroxyl groups of the C2 to C6 polyhydric alcohol is preferably 2 to 3 from the viewpoint of the auxiliary plasticizing effect of the polyhydric alcohol-lower fatty acid ester (B) for the plasticizer.

Of these polyhydric alcohols, ethylene glycol, propylene glycol, and glycerin having a carbon number of 2 to 3 and a hydroxyl group number of 2 to 3 are preferred, and glycerin having a carbon number of 3 and a hydroxyl group number of 3 is most preferred from the viewpoint of the water solubility of the polyhydric alcohol-lower fatty acid ester (B) and the auxiliary plasticizing effect for the plasticizer.

Specific examples of the polyhydric alcohol-lower fatty acid ester (B) include ethylene glycol-fatty acid esters such as ethylene glycol diacetate; propylene glycol-fatty acid esters such as propylene glycol diacetate, propylene glycol monobutyrate, and propylene glycol dibutyrate; glycerin-fatty acid esters such as monoacetin (glycerol monoacetate), diacetin (glycerol diacetate), triacetin (glycerol triacetate), monobutyrin (glycerol monobutyrate), dibutyrin (glycerol dibutyrate), and tributyrin (glycerol tributyrate); butanediol-fatty acid esters such as 1,3-butanediol diacetate and 1,4-butanediol diacetate; and hexanediol-fatty acid esters such as 1,6-hexanediol diacetate.

The number of the ester bonds of the polyhydric alcohol-lower fatty acid ester (B) is preferably 1 to 3 from the viewpoint of the auxiliary plasticizing effect of the polyhydric alcohol-lower fatty acid ester (B) for the plasticizer. If the ester bond number of the polyhydric alcohol-lower fatty acid ester (B) is excessively great, the polyhydric alcohol-lower fatty acid ester (B) has a reduced hydroxyl group number and, therefore, disadvantageously tends to have a lower water solubility, thereby suffering from phase separation during the film formation.

From the viewpoint of the water solubility and the auxiliary plasticizing effect, it is preferred that the ester bonds and the hydroxyl groups coexist in the polyhydric alcohol-lower fatty acid ester (B). The ratio of the ester bond number to the hydroxyl group number of the polyhydric alcohol-lower fatty acid ester (B) is preferably 20/80 to 80/20, more preferably 30/70 to 70/30. If the ratio is excessively high, i.e., if the ester bond number relative to the hydroxyl group number is excessively great, the polyhydric alcohol-lower fatty acid ester (B) has a smaller hydroxyl group number and, therefore, is liable to have a lower water solubility, thereby suffering from phase separation during the film formation. If the ratio is excessively low, i.e., if the ester bond number relative to the hydroxyl group number is excessively small, it tends to be difficult to provide the effects of the present disclosure.

Of these polyhydric alcohol-lower fatty acid esters (B), fatty acid esters of polyhydric alcohols each having a carbon number of 2 to 3 and a hydroxyl group number of 2 to 3, i.e., fatty acid esters of ethylene glycol, propylene glycol, and glycerin, are preferred, which each have an ester bond number of 1 to 3. Further, glycerin acetic acid esters such as monoacetin, diacetin, and triacetin are preferred from the viewpoint of the water solubility and the auxiliary plasticizing effect of the polyhydric alcohol-lower fatty acid ester (B). Particularly, monoacetin and diacetin in which the ratio of the ester bond number to the hydroxyl group number is 20/80 to 80/20 are most preferred.

These polyhydric alcohol-lower fatty acid esters may be used alone or in combination as the polyhydric alcohol-lower fatty acid ester (B).

<Plasticizer (C)>

The PVA film of the present disclosure preferably contains a plasticizer (C) in addition to the PVA resin (A) and the polyhydric alcohol-lower fatty acid ester (B) in order to ensure the flexibility of the film and the easy formability. As the plasticizer (C), a single type of plasticizer may be used, or two or more types of plasticizers may be used in combination. However, two or more types of plasticizers are preferably used as the plasticizer (C) from the viewpoint of the toughness of the film for use as the packaging material, particularly from the viewpoint of the long-term shape stability of a liquid detergent package produced by packaging a liquid detergent with the film. The plasticizer (C) to be contained in the PVA film typically has a molecular weight of 50 to 2,000, particularly preferably 60 to 500, more preferably 80 to 250.

Where two or more types of plasticizers are used in combination as the plasticizer (C), it is preferred to use two types of plasticizers including a polyhydric alcohol (C1) having a melting point of not lower than 80° C. (hereinafter sometimes referred to simply as "plasticizer (C1)") and a polyhydric alcohol (C2) having a melting point of not higher than 50° C. (hereinafter sometimes referred to simply as "plasticizer (C2)") from the viewpoint of the toughness of the PVA film during the production of the film and the production of the package and from the viewpoint of the long-term shape stability of a liquid chemical agent package produced by packaging a liquid chemical agent with the film.

Many sugar alcohols, monosaccharides, and polysaccharides are usable as the polyhydric alcohol (C1) having a melting point of not lower than 80° C., i.e., as the plasticizer (C1). Examples of the plasticizer (C1) include: divalent alcohols such as salicyl alcohol (83° C.), catechol (105° C.), resorcinol (110° C.), hydroquinone (172° C.), bisphenol-A (158° C.), bisphenol-F (162° C.), and neopentyl glycol (127° C.); trivalent alcohols such as phloroglucinol (218° C.); tetravalent alcohols such as erythritol (121° C.), threitol (88° C.), and pentaerythritol (260° C.); pentavalent alcohols such as xylitol (92° C.), arabitol (103° C.), fucitol (153° C.), glucose (146° C.), and fructose (104° C.); hexavalent alcohols such as mannitol (166° C.), sorbitol (95° C.), and inositol (225° C.); octavalent alcohols such as lactitol (146° C.), sucrose (186° C.), and trehalose (97° C.); and nonavalent and higher-valent alcohols such as maltitol (145° C.), which may be used alone or in combination. Parenthesized numerals indicate the melting points of the respective compounds.

Of the aforementioned polyhydric alcohols, polyhydric alcohols having a melting point of not lower than 85° C. are preferred, and polyhydric alcohols having a melting point of not lower than 90° C. are particularly preferred from the viewpoint of the tensile strength of the PVA film. The upper limit of the melting point is typically 300° C., particularly preferably 200° C.

In the present disclosure, the plasticizer (C1) preferably has 4 or more hydroxyl groups in its molecule from the viewpoint of compatibility with the PVA resin (A), particularly preferably 5 to 10 hydroxyl groups, more preferably 6 to 8 hydroxyl groups, in its molecule. Specifically, for example, sorbitol, sucrose, trehalose or the like is preferred.

In the present disclosure, the plasticizer (C1) preferably has a molecular weight of not less than 150, more preferably 160 to 500, particularly preferably 180 to 400, from the viewpoint of the tension of the PVA film. Specifically, for example, sorbitol, sucrose or the like is preferred.

On the other hand, many aliphatic alcohols are usable as the polyhydric alcohol (C2) having a melting point of not higher than 50° C., i.e., the plasticizer (C2). Examples of the plasticizer (C2) include: divalent alcohols such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, and polyethylene glycols having a molecular weight of not greater than 2,000; and trivalent and higher-valent alcohols such as glycerin (18° C.), diglycerin, and triethanolamine (21° C.). From the viewpoint of the flexibility of the PVA film, the melting point is preferably not higher than 30° C., particularly preferably not higher than 20° C. The lower limit of the melting point is typically −80° C., preferably −10° C., particularly preferably 0° C. These polyhydric alcohols may be used alone or in combination. Parenthesized numerals indicate the melting points of the respective compounds.

In the present disclosure, the plasticizer (C2) preferably has 4 or less hydroxyl groups, particularly preferably 3 or less hydroxyl groups, in its molecule for easier control of the flexibility of the film at around a room temperature (25° C.). Specifically, for example, glycerin or the like is preferred.

In the present disclosure, the plasticizer (C2) preferably has a molecular weight of not higher than 100, particularly preferably 50 to 100, more preferably 60 to 95, from the viewpoint of easier control of the flexibility of the film. Specifically, for example, glycerin or the like is preferred.

In the present disclosure, an additional plasticizer (C3) may be used in combination with the aforementioned plasticizers (C1) and (C2). Examples of the plasticizer (C3) include: alcohols such as trimethylolpropane (58° C.), diethylene glycol monomethyl ether, cyclohexanol, carbitol, and polypropylene glycol; ethers such as dibutyl ether; carboxylic acids such as stearic acid, oleic acid, linoleic acid, linolenic acid, sorbic acid, citric acid, and adipic acid; ketones such as cyclohexanone; amines such as monoethanolamine, triethanolamine, ethylenediamine, and imidazole compounds; and amino acids such as alanine, glycine, aspartic acid, glutamic acid, histidine, lysine, and cysteine. From the viewpoint of excellent curl resistance and the balance between the strength and the flexibility of the film, a polyhydric alcohol having a melting point of higher than 50° C. and lower than 80° C. is preferably used as the plasticizer (C3) in combination with the plasticizers (C1) and (C2), i.e., three types of plasticizers are preferably used. Particularly, trimethylolpropane is preferably used as the plasticizer (C3).

In the present disclosure, the amount of the plasticizer (C) contained in the PVA film is preferably not less than 5 parts by weight, particularly preferably 5 to 70 parts by weight, more preferably 8 to 60 parts by weight, especially preferably 10 to 50 parts by weight, based on 100 parts by weight of the PVA resin (A). If the amount of the plasticizer (C) is excessively small, the PVA film tends to be poorer in long-term shape stability when a package is produced by packaging liquid such as a liquid detergent with the PVA film. If the amount of the plasticizer (C) is excessively great, the PVA film is liable to have a lower mechanical strength and suffer from the blocking.

The weight ratio (C1)/(C2) between the plasticizer (C1) and the plasticizer (C2) is preferably 0.1 to 5, particularly preferably 0.2 to 4.5, more preferably 0.5 to 4, especially preferably 0.7 to 3. If the weight ratio is excessively low, the PVA film tends to be excessively soft, thereby suffering from the blocking. If the weight ratio is excessively high, the PVA film tends to be excessively hard to be thereby brittle in a lower humidity environment.

The amount of the plasticizer (C1) is preferably 5 to 40 parts by weight, particularly preferably 8 to 30 parts by weight, more preferably 10 to 25 parts by weight, based on 100 parts by weight of the PVA resin (A), and the amount of the plasticizer (C2) is preferably 5 to 40 parts by weight, particularly preferably 10 to 35 parts by weight, more preferably 15 to 30 parts by weight, based on 100 parts by weight of the PVA resin (A).

If the amount of the plasticizer (C1) is excessively small, the PVA film tends to be excessively hard. If the amount of the plasticizer (C1) is excessively great, the PVA film tends to be excessively soft. If the amount of the plasticizer (C2) is excessively small, the PVA film tends to be excessively hard to be thereby brittle in the lower humidity environment. If the amount of the plasticizer (C2) is excessively great, the PVA film tends to be excessively soft, thereby suffering from the blocking.

Further, the total amount of the plasticizer (C1) and the plasticizer (C2) is preferably not less than 70 wt. %, particularly preferably not less than 80 wt. %, more preferably not less than 85 wt. %, based on the overall amount of plasticizer (C). If the total amount of the plasticizers (C1) and (C2) is excessively small, the PVA film tends to have a lower mechanical strength.

Where the plasticizer (C3) is used in addition to the plasticizer (C1) and the plasticizer (C2), the amount of the plasticizer (C3) is preferably not greater than 20 wt. % based on the total weight of the plasticizers (C1), (C2), and (C3). From the viewpoint of easy formability, pinhole resistance, and bag fracture resistance, the amount of the plasticizer (C3) is particularly preferably 0.5 to 18 wt. %, more preferably 2 to 15 wt. %, especially preferably 4 to 13 wt. %, based on the total amount of the plasticizers (C1), (C2), and (C3). If the amount of the plasticizer (C3) is excessively great, the film is liable to be poorer in pinhole resistance and bag fracture resistance with significant change in film state at ordinary temperatures and higher temperatures.

In the present disclosure, the PVA film preferably contains the polyhydric alcohol-lower fatty acid ester (B) and the plasticizer (C), and the weight ratio (B)/(C) between the polyhydric alcohol-lower fatty acid ester (B) and the plasticizer (C) preferably falls within a specific range for improvement of the transparency of the PVA film.

The weight ratio (B)/(C) of the polyhydric alcohol-lower fatty acid ester (B) to the plasticizer (C) in the PVA film is preferably 0.00001 to 0.015, particularly preferably 0.0001 to 0.01, more preferably 0.0005 to 0.005. If the weight ratio (B)/(C) is excessively high, the PVA film tends to have a lower transparency with an increased haze. If the weight ratio (B)/(C) is excessively low, the PVA film tends to have an insufficient antistatic property, and the haze-reducing effect is liable to be insufficient, making it difficult to provide a transparency-improving effect.

As required, the PVA film of the present disclosure may further contain a filler (D) and a surfactant (E).

<Filler (D)>

The filler (D) is used to impart the film with an antiblocking property. Examples of the filler (D) include organic filler (D1) and inorganic filler (D2). Of these, the organic filler is preferred. For improvement of the water sealability in package production, the organic filler (D1) and the inorganic filler (D2) are preferably used in combination. The filler (D) typically has an average particle diameter of 1 to 50 μm.

In the present disclosure, the organic filler (D1) means organic compound particles (primary particles) in needle form, bar form, lamellar form, scale form, spherical form or any given form, or agglomerates (secondary particles) of the organic compound particles.

The organic filler (D1) is mainly selected from polymer compounds. Examples of the polymer compounds include melamine resins, polymethyl (meth)acrylate resins, polystyrene resins, starches, polylactic acids, and other biodegradable resins. Of these, biodegradable resins such as the polymethyl (meth)acrylate resins, the polystyrene resins, and the starches are preferred. Particularly, the starches are preferred from the viewpoint of the dispersibility thereof in the PVA resin (A).

Examples of the starches include raw starches (corn starch, potato starch, sweet potato starch, wheat starch, cassava starch, sago starch, tapioca starch, sorghum starch, rice starch, pea starch, kudzu starch, bracken starch, lotus starch, water chestnut starch, and the like), physically modified starches (α-starch, fractionated amylose, moist heat-treated starch, and the like), enzyme-modified starches (hydrolyzed dextrin, enzyme-decomposed dextrin, amylose, and the like), chemically degraded starches (acid-treated starch, hypochlorous acid-oxidized starch, dialdehyde starch, and the like), and chemically modified starch derivatives (esterified starch, etherified starch, cationized starch, crosslinked starch, and the like). Of these, the raw starches, particularly the corn starch and the rice starch, are preferably used from the viewpoint of availability and economy.

The organic filler (D1) preferably has an average particle diameter of 5 to 50 μm, particularly preferably 10 to 40 μm, more preferably 15 to 35 μm. If the average particle diameter is excessively small, the PVA film is more liable to suffer from the blocking. If the average particle diameter is excessively great, the particles of the filler are liable to agglomerate to be thereby deteriorated in dispersibility. Further, the PVA film tends to suffer from pinholes when being stretched in the film processing.

The average particle diameter of the organic filler (D1) is calculated based on a D50 value of cumulative volume distribution (a particle diameter for cumulative 50% of particles) measured by means of a particle size distribution measuring apparatus of laser diffraction type.

In the present disclosure, the inorganic filler (D2) means inorganic compound particles (primary particles) in needle form, bar form, lamellar form, scale form, spherical form or any given form, or agglomerates (secondary particles) of the inorganic compound particles.

Examples of the inorganic filler (D2) include oxide inorganic compounds such as silica (silicon dioxide), diatom earth, titanium oxide, calcium oxide, magnesium oxide, aluminum oxide, barium oxide, germanium oxide, tin oxide, and zinc oxide, talc, clay, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate.

These fillers may be used alone or in combination as the filler (D).

Of these, the oxide inorganic compounds and talc are preferred because of their excellent hydrogen bond effect with respect to the PVA resin (A) and their higher water sealability-improving effect. Particularly, titanium oxide, talc or silica is preferably used, and silica is more preferably used.

The inorganic filler (D2) preferably has an average particle diameter of 1 to 20 μm, particularly preferably 2 to 15 μm, more preferably 3 to 10 μm. If the average particle diameter is excessively small, the PVA film tends to be deteriorated in flexibility and toughness, and is more susceptible to the blocking. If the average particle diameter is excessively great, it tends to be difficult to provide the water sealability-improving effect.

The average particle diameter of the inorganic filler (D2) is calculated based on a D50 value of cumulative volume distribution (a particle diameter for cumulative 50% of particles) measured by means of a particle size distribution measuring apparatus of laser diffraction type.

The amount of the filler (D) is preferably 1 to 30 parts by weight, particularly preferably 2 to 25 parts by weight, more preferably 2.5 to 20 parts by weight, based on 100 parts by weight of the PVA resin (A). If the amount of the filler (D) is excessively small, the PVA film is more susceptible to the blocking. If the amount of the filler (D) is excessively great, the PVA film tends to be poorer in flexibility and toughness.

Where the organic filler (D1) and the inorganic filler (D2) are used in combination as the filler (D), the weight ratio (D1)/(D2) of the organic filler (D1) to the inorganic filler (D2) is preferably 2 to 15, particularly preferably 3 to 13, more preferably 4 to 10. If the amount of the organic filler (D1) relative to the inorganic filler (D2) is excessively small, the PVA film tends to be poorer in flexibility and toughness, making it difficult to produce an excellent package. If the amount of the organic filler (D1) relative to the inorganic filler (D2) is excessively great, the PVA film tends to be poorer in water sealability.

<Surfactant (E)>

In the present disclosure, the surfactant (E) is used for improvement of the peelability of the PVA film when the film is removed from a cast surface in the production of the PVA film. A nonionic surfactant, a cationic surfactant or an anionic surfactant is typically used as the surfactant (E). Examples of the surfactant (E) include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers such as polyoxyethylene laurylamino ether and polyoxyethylene stearylamino ether. Of these, the polyoxyalkylene alkyl ether phosphate monoethanolamine salts and polyoxyethylene laurylamino ether are preferred from the viewpoint of production stability.

The surfactants described above may be used alone or in combination as the surfactant (E).

The amount of the surfactant (E) is preferably 0.01 to 3 parts by weight, particularly preferably 0.05 to 2.5 parts by weight, more preferably 0.1 to 2 parts by weight, based on 100 parts by weight of the PVA resin (A). If the amount of the surfactant (E) is excessively small, the PVA film tends to have poorer peelability when being removed from a cast surface of a film forming apparatus in the film production, thereby reducing the productivity. If the amount of the surfactant (E) is excessively great, the PVA film disadvantageously tends to have a reduced adhesive strength when being sealed in production of a package.

In the present disclosure, constituent components of the PVA film may virtually include the PVA resin (A) and the polyhydric alcohol-lower fatty acid ester (B) and, as required, the plasticizer (C), the filler (D), and the surfactant (E), and may further contain any of the following optional components. The components to be contained as required may be used alone or in combination.

The PVA film may contain additional water-soluble polymer other than the PVA resin (A) (e.g., sodium polyacrylate, polyethylene oxide, polyvinyl pyrrolidone, dextrin, chitosan, chitin, methylcellulose, hydroxyethylcellulose or the like), perfume, rust preventing agent, colorant, bulking agent, defoaming agent, UV absorber, liquid paraffins, fluorescent brightener, and bitter component (e.g., denatonium benzoate or the like), as long as the object of the present disclosure is not impaired. These may be used alone or in combination.

In the present disclosure, the PVA film preferably further contains an antioxidant for suppression of yellowing. Examples of the antioxidant include sulfites such as sodium sulfite, potassium sulfite, calcium sulfite, and ammonium sulfite, tartaric acid, ascorbic acid, sodium thiosulfate, catechol, and Rongalite. Of these, the sulfites are preferred, and sodium sulfite is particularly preferred. The amount of the antioxidant is preferably 0.1 to 10 parts by weight, particularly preferably 0.2 to 5 parts by weight, more preferably 0.3 to 3 parts by weight, based on 100 parts by weight of the PVA resin (A).

<Production of PVA Film>

The PVA film of the present disclosure may be produced by preparing an aqueous solution (film formation material) of a PVA resin composition containing the PVA resin (A) and the polyhydric alcohol-lower fatty acid ester (B) and, as required, the plasticizer (C), the filler (D), the surfactant (E), and other optional components, and forming the aqueous solution into a film.

Exemplary methods for preparing the aqueous solution of the PVA resin composition include: (1) a method in which the PVA resin (A) and the polyhydric alcohol-lower fatty acid ester (B) and, as required, the plasticizer (C), the filler (D), the surfactant (E), and other optional components are preliminarily mixed together, and the resulting PVA resin composition is dissolved or dispersed in water; and (2) a method in which the polyhydric alcohol-lower fatty acid ester (B) is added to a PVA resin aqueous solution prepared by dissolving or dispersing a PVA resin composition containing the PVA resin (A) and, as required, the plasticizer (C), the filler (D), the surfactant (E), and other optional components in water. The method (2) is preferred because the thermal degradation of the polyhydric alcohol-lower fatty acid ester (B) can be suppressed.

The method (2) will hereinafter be described in detail.

The PVA film can be produced by a production method including, in this order: a dissolution step of dissolving or dispersing a PVA resin composition containing the PVA resin (A) and preferably further containing the plasticizer (C), the filler (D), and the surfactant (E) in water to prepare a PVA resin aqueous solution; a film formation material preparing step of adding the polyhydric alcohol-lower fatty acid ester (B) to the PVA resin aqueous solution prepared in the dissolution step to prepare a film formation material; and a film forming step of forming a PVA film by using the film formation material prepared in the film formation material preparing step.

The respective steps will hereinafter be described specifically.

[Dissolution Step]

In the dissolution step, the PVA resin composition is dissolved or dispersed in water, whereby the PVA resin aqueous solution is prepared.

In the dissolution step, the PVA resin aqueous solution is prepared with the PVA resin composition dissolved or dispersed in water without undissolved matter.

A normal-temperature dissolution method, a high-temperature dissolution method or a pressure dissolution method is typically employed in the dissolution step of dissolving the PVA resin composition in water. Particularly, the high-temperature dissolution method and the pressure dissolution method are preferred because these methods reduce the amount of the undissolved matter and ensure a higher productivity.

The dissolution temperature in the high-temperature dissolution method is typically 80° C. to 100° C., preferably 90° C. to 95° C., and the dissolution temperature in the pressure dissolution method is typically 80° C. to 130° C., preferably 90° C. to 120° C. The dissolution period is properly adjusted depending on the dissolution temperature and the pressure for the dissolution, but is typically 1 to 20 hours, preferably 2 to 15 hours, more preferably 3 to 10 hours. If the dissolution period is excessively short, the undissolved matter tends to remain. If the dissolution period is excessively long, the productivity tends to be reduced.

In the dissolution step, a paddle, a full-zone stirring blade, a max-blend stirring blade, a twister, an anchor stirring blade, a ribbon, a propeller or the like is used as a stirring blade.

[Film Formation Material Preparing Step]

In the film formation material preparing step, the film formation material is prepared by adding the polyhydric alcohol-lower fatty acid ester (B) to the PVA resin aqueous solution prepared in the dissolution step.

The concentration of the polyhydric alcohol-lower fatty acid ester (B) in the PVA resin aqueous solution is 0.0001 to 2 wt. %, particularly preferably 0.001 to 1 wt. %, more preferably 0.01 to 0.5 wt. %. If the concentration of the polyhydric alcohol-lower fatty acid ester (B) is excessively low, it will be impossible to provide a sufficient antistatic property and a transparency-improving effect with an insufficient haze-reducing effect. If the concentration of the polyhydric alcohol-lower fatty acid ester (B) is excessively high, the PVA film tends to have a lower transparency with an increased haze.

The film formation material preferably has a solid concentration of 10 to 50 wt. %, particularly preferably 15 to 40 wt. %, more preferably 20 to 35 wt. %. If the solid concentration is excessively low, the productivity of the film tends to be reduced. If the solid concentration is excessively high, the film formation material tends to have an excessively high viscosity, requiring a longer period of time for defoaming the film formation material. Further, a die line tends to occur in the film in the film formation.

After the dissolution, the resulting PVA resin aqueous solution is defoamed. Exemplary methods for the defoaming include stationary defoaming method, vacuum defoaming method, and biaxial extrusion defoaming method. Particularly, the stationary defoaming method and the biaxial extrusion defoaming method are preferred. The temperature for the stationary defoaming method is typically 50° C. to 100° C., preferably 70° C. to 95° C., and the defoaming period is typically 2 to 30 hours, preferably 5 to 20 hours.

[Film Forming Step]

In the film forming step, the film formation material prepared in the film formation material preparing step is formed into a film and, as required, the resulting film is dried, whereby the PVA film is produced as having a water content of not higher than 15 wt. %.

Exemplary film formation methods include melt extrusion method and casting method. From the viewpoint of the accuracy of the thickness of the film, the casting method is preferred.

Exemplary casting methods include: (i) a method in which the film formation material is cast on a cast surface such as a metal surface through a gap with the use of an applicator or a bar coater; and (ii) a method in which the film formation material is cast on a case surface such as a metal surface of an endless belt or a drum roll through a slit of a T-slit die. The film formation material thus cast is dried, whereby the PVA film of the present disclosure is produced.

The method (ii) will hereinafter be described, in which the PVA film is produced by casting the film formation material on the cast surface of the cast drum (drum roll), the endless belt or the like from the T-slit die, and drying the resulting film.

The temperature of the film formation material immediately before the casting is preferably 60° C. to 98° C., particularly preferably 70° C. to 95° C. If the temperature is excessively low, the film formation material tends to have a higher viscosity, thereby reducing the productivity of the PVA film. If the temperature is excessively high, the film formation material tends to suffer from foaming or the like.

When the film formation material is dried on the cast surface after the casting, the surface temperature of the cast surface is preferably 50° C. to 110° C., particularly preferably 70° C. to 100° C. If the surface temperature is excessively low, the film tends to have a higher water content due to insufficient drying, thereby suffering from the blocking. If the surface temperature is excessively high, the film formation material is liable to foam, resulting in film formation failure.

Exemplary methods for the drying in the film formation include: a method in which a heat roll is used for the drying; a method in which hot air is applied onto the film by means of a floating dryer; and a method in which a far infrared device or a dielectric heating device is used for the drying. After the film formation material is dried to a water content of not higher than 15 wt. % by any of the aforementioned drying methods, the resulting PVA film is peeled off from the cast surface (or from the drying heat roll when the PVA film is dried on the heat roll after being peeled off from the cast surface). The PVA film peeled off from the cast surface (or from the drying heat roll) is cooled in an environment at 10° C. to 35° C.

The PVA film of the present disclosure may have plain surfaces, but one or both of the surfaces of the PVA film are preferably subjected to a texturing process so as to be imparted with an emboss pattern, a minute uneven pattern, a special engraved pattern or the like for the antiblocking property, the slidability during the processing, and the appearance, and for suppression of adhesion between film products.

The temperature for the texturing process is typically 60° C. to 150° C., preferably 80° C. to 140° C. The pressure for the texturing process is typically 2 to 8 MPa, preferably 3 to 7 MPa. The period for the texturing process depends on the texturing pressure and the film formation rate, but is typically 0.01 to 5 seconds, preferably 0.1 to 3 seconds.

After the texturing process, as required, the PVA film may be subjected to a cooling process for prevention of unintended thermal stretching of the film.

In the present disclosure, the PVA film is preferably produced in an environment at 10° C. to 35° C., particularly preferably 15° C. to 30° C. The humidity is typically not higher than 70% RH.

Thus, the PVA film of the present disclosure can be produced.

[Other Process]

Where the PVA film is produced in a web form, as required, the PVA film is subjected to a winding step, a packaging step, a storing step, a transporting step, and the like after the film forming step described above.

In the winding step, the PVA film peeled off from the cast surface in the film forming step is transported to be wound up around a core pipe (S1) into a film roll. The resulting film roll may be supplied as a product on an as-is basis. Preferably, the PVA film thus wound up may be slit to a desired width, then wound up again around a core pipe (S2) having a length corresponding to the desired film width, and supplied in the form of a film roll having a desired size.

The core pipe (S1) around which the PVA film is wound up has a hollow cylindrical shape. The material for the core pipe (S1) may be properly selected from metals, plastics, and the like, but is preferably a metal for robustness and strength.

The core pipe (S1) preferably has an inner diameter of 3 to 30 cm, more preferably 10 to 20 cm. The core pipe (S1) preferably has a wall thickness of 1 to 30 mm, more preferably 2 to 25 mm. The core pipe (S1) needs to have a length that is greater than the width of the film, and opposite end portions of the core pipe (S1) preferably project by 1 to 50 cm from opposite ends of the film roll.

The core pipe (S2) has a hollow cylindrical shape. The material for the core pipe (S2) may be properly selected from paper, metals, plastics, and the like, but is preferably paper for weight reduction and handling ease.

The core pipe (S2) preferably has an inner diameter of 3 to 30 cm, more preferably 10 to 20 cm. The core pipe (S2) preferably has a wall thickness of 1 to 30 mm, more preferably 3 to 25 mm. The core pipe (S2) may have a length that is equal to or greater than the width of the PVA film product, but is preferably greater than the film width by 0 cm to 50 cm.

The PVA film is slit to a desired width when being wound up around the core pipe (S2).

For the slitting, a shear blade, a razor blade or the like is used. The PVA film is preferably slit by means of the shear blade from the viewpoint of the smoothness of a sectional surface of the slit film.

The PVA film of the present disclosure preferably has a thickness of 10 to 120 μm, particularly preferably 30 to 110 μm, more preferably 60 to 100 μm. If the thickness of the PVA film is excessively small, the PVA film tends to have a lower mechanical strength. If the thickness of the PVA film is excessively great, the PVA film tends to be dissolved at a lower dissolution rate in water, and the film formation efficiency tends to be reduced.

The PVA film of the present disclosure preferably has a width of 100 to 5,000 mm, particularly preferably 200 to 2,000 mm, more preferably 300 to 1,000 mm. If the width of the PVA film is excessively small, the production efficiency tends to be reduced. If the width of the PVA film is excessively great, it tends to be difficult to control the slackness and the thickness of the film.

Further, the length of the PVA film of the present disclosure is properly selected according to the use purpose, but is preferably 100 to 20,000 m, particularly preferably 800 to 15,000 m, more preferably 1,000 to 10,000 m. If the length of the PVA film is excessively small, the PVA film tends to require troublesome film switching during use. If the length of the PVA film is excessively great, the resulting film roll tends to have a poorer appearance due to tight winding and an excessively great weight.

The PVA film preferably has a water content of 1 to 12 wt. %, particularly preferably 4 to 10 wt. %. If the water content of the PVA film is excessively low, the PVA film tends to be excessively hard, resulting in a poorer package formability and a lower impact resistance of the package. If the water content of the PVA film is excessively high, the PVA film is more susceptible to the blocking.

The film roll produced by winding up the PVA film of the present disclosure around the core pipe is preferably wrapped with a wrapping film of a water vapor barrier resin. The wrapping film is not particularly limited, but a wrapping film having a water vapor permeability of not greater than 10 g/m$^2$/day (as measured in conformity with JIS Z0208) is usable. Specific examples of the wrapping film include single-layer films such as high-density polyethylene film, low-density polyethylene film, polypropylene film, polyester film, polyvinylidene chloride-coated polypropylene film, and glass-deposited polyester film, laminate films including any of the aforementioned films, and laminate films including any of the aforementioned films and slit fabric, paper or nonwoven fabric. Examples of the laminate films include laminate film including glass-deposited polyester film and polyethylene film, and laminate film including polyvinylidene chloride-coated polypropylene film and polyethylene film.

The wrapping film is preferably subjected to an antistatic process for prevention of contamination with foreign matter. The wrapping film may contain an antistatic agent incorporated therein by kneading, or may be surface-coated with the antistatic agent. Where the antistatic agent is incorporated in the wrapping film by the kneading, the antistatic agent is used in an amount of about 0.01 to about 5 wt. % based on the weight of the resin for the wrapping film. Where the wrapping film is surface-coated with the antistatic agent, the antistatic agent is used in an amount of about 0.01 to about 1 g/m$^2$.

Examples of the antistatic agent include alkyl diethanolamines, polyoxyethylene alkylamines, higher fatty acid alkanolamides, and sorbitan fatty acid esters.

The film roll wrapped with the wrapping film of the water vapor barrier resin is preferably further wrapped with a wrapping film of an aluminum material. Examples of the aluminum material film include aluminum foil, laminate film including aluminum foil and moisture-resistant plastic film (e.g., laminate film including aluminum foil and polyethylene film), laminate film including aluminum-deposited film and moisture-resistant plastic film (e.g., laminate film including aluminum-deposited polyester film and polyethylene film), and laminate film including alumina-deposited film and moisture-resistant plastic film (e.g., laminate film including alumina-deposited polyester film and polyethylene film). Of these, laminate film including aluminum foil and polyolefin film, and laminate film including aluminum-deposited film and polyolefin film are particularly useful, and laminate film of stretched polypropylene film/polyethylene film/aluminum foil/polyethylene film structure, and laminate film of stretched polypropylene film/low-density polyethylene film/aluminum foil structure are especially useful.

The film roll may be first wrapped with an inner wrapping film of the water vapor barrier resin and then with an outer wrapping film of the aluminum material, and widthwise margins of the wrapping films may be squeezed into the core pipe.

Protection pads each having a core pipe through-hole are respectively attached to opposite ends of the film roll directly or with the intervention of the wrapping film in order to prevent the ends of the film roll from being damaged or contaminated with dust or other foreign matter.

Practical examples of the protection pads include disk-shaped sheets and films conforming to the shape of the film roll. The protection pads are preferably made of foam, woven fabric, nonwoven fabric or the like so as to be imparted with a cushioning function for enhanced protection effect. Further, the protection pads may additionally contain a desiccant, or may be laminated with or incorporated with the desiccant so as to protect the film roll from moisture. Plastics are useful as the material for the protection pads. Specific examples of the plastics include polystyrenes, polyethylenes, polypropylenes, polyesters, and polyvinyl chlorides.

Examples of the desiccant-containing protection pads include protection pads each including a moisture absorbing layer produced by incorporating a desiccant or a water absorbing agent such as calcium chloride, silica gel, molecular sieves, saccharide (particularly, saccharide having a higher osmotic pressure) or water absorbing resin into a formable material such as natural cellulose, synthetic cellulose, glass cloth or nonwoven fabric by a dispersing method, an impregnating method or a coating/drying method, and protection pads each produced by sandwiching the desiccant or the water absorbing agent between layers of the aforementioned formable material or between thermoplastic resin films such as polyester films, polyethylene films, polypropylene films or TEFLON (registered trade name) films.

Commercially available examples of a desiccant sheet include AIDI SHEET available from Aidi Co., Ltd., ARROW SHEET and ZEO SHEET available from Shinagawa Chemicals Co., Ltd., and HIGHSHEET DRY available from Highsheet Kogyo Co., Ltd.

The film roll wrapped in the aforementioned manner is preferably supported in the air without contact with the floor by providing brackets (support plates) to the projecting opposite end portions of the core pipe or by resting the projecting opposite end portions on trestles and, in this state, stored or transported. Where the film has a relatively small width, the brackets are used. Where the film has a relatively great width, the trestles are used. The brackets are each made of a plywood or a plastic plate, and dimensioned so that four edges thereof each have a length greater than the diameter of the film roll.

The pair of brackets are disposed upright in opposed relation to the opposite end portions of the core pipe projecting from the film roll, and engaged with the film roll. For the engagement, the brackets each have a through-hole formed in a center portion thereof as having a diameter slightly greater than the core pipe diameter.

Alternatively, the brackets may each have a generally U-shape with a through-hole extending from a top edge thereof to a center portion thereof for easy insertion of the core pipe.

The film roll supported by the brackets is contained in a carton such as cardboard box and, in this state, stored and transported. Where rectangular brackets are used, the four corners of each of the brackets are preferably cut off for smooth handling of the film roll during the storage. Further, it is advantageous to firmly fix the pair of brackets to each other by a binding tape. For practical prevention of displacement and slack of the tape, the brackets may each have a tape displacement preventing groove formed in a side face (thicknesswise portion) thereof as having substantially the same width as the tape.

It is desirable to avoid an excessively high temperature, an excessively low temperature, an excessively low humidity, and an excessively high humidity when the wrapped film roll is stored or transported. Specifically, the wrapped film roll is preferably stored or transported at a temperature of 10° C. to 30° C. at a humidity of 40 to 75% RH.

The PVA film of the present disclosure thus produced is highly transparent and excellent in antistatic property. Therefore, the PVA film is useful for polarization film applications requiring higher optical properties (for liquid crystal TVs, smartphones, tablet computers, personal computers, projectors, onboard panels, and the like), and for water-soluble film applications (unit packaging applications for chemical agents such as agricultural chemicals and detergents, (water pressure) transfer films, sanitary supplies such as sanitary napkins and disposable diapers, waste disposal supplies such as ostomy bags, medical supplies such as blood-absorbing sheets, and temporary base materials for seeding sheets, seeding tapes, and embroidery bases).

Particularly, the PVA film of the present disclosure is excellent in design feasibility because of its higher transparency, excellent antistatic property and, hence, excellent printability. Where the PVA resin includes the modified PVA resin, the PVA film is also excellent in cold-water solubility and, therefore, is useful for individual packaging applications for packaging chemical agents and the like (chemical agent packages).

Where the PVA resin includes two or more types of PVA resins, the PVA film of the present disclosure is excellent in cold-water solubility and sealability and, therefore, particularly useful for the individual packaging applications for packaging chemical agents and the like (chemical agent packages).

<Chemical Agent Package>

A chemical agent package of the present disclosure includes a package bag formed from the PVA film of the present disclosure and a chemical agent contained in the package bag, and preferably includes only the package bag and the chemical agent contained in the package bag. The chemical agent package of the present disclosure is produced by packaging the chemical agent with the PVA film. The chemical agent is packaged with the water-soluble PVA film and, therefore, when the entire chemical agent package is put in water, the PVA film is dissolved in water, and then the chemical agent is dissolved or dispersed in water to exhibit its effect. The chemical agent package is advantageously used as a chemical agent package in which a relatively small amount (a single dose) of the chemical agent is packaged.

Examples of the chemical agent to be contained in the package bag include agricultural chemicals such as pesticide, disinfectant, and herbicide, fertilizers, and detergents, and the detergents are particularly preferred.

The form of the chemical agent may be liquid or solid. The liquid chemical agent is in a liquid form. The solid chemical agent may be in a granular form, a tablet form or a powdery form. The chemical agent is preferably dissolved or dispersed in water for use. In the present disclosure, the chemical agent package particularly preferably contains a liquid detergent therein.

The pH of the chemical agent may be alkaline, neutral or acidic.

The chemical agent package typically has a smooth surface. However, the outer surface of the package (PVA film) may be textured so as to be imparted with an emboss pattern, a minute uneven pattern, a special engraved pattern or the like for the antiblocking property, the slidability during processing, and the appearance, and for suppression of adhesion between products (packages).

The liquid detergent package as an example of the chemical agent package of the present disclosure will hereinafter be described.

The liquid detergent package maintains its shape with the liquid detergent contained therein during the storage thereof. When the liquid detergent package is used (for laundry washing), the package bag (PVA film) is brought into contact with water to be dissolved in water, whereby the contained liquid detergent flows out of the package bag.

The liquid detergent package typically has a length of 10 to 50 mm, preferably 20 to 40 mm.

The package bag formed from the PVA film typically has a film thickness of 10 to 120 μm, preferably 15 to 110 μm, more preferably 20 to 100 μm.

The amount of the liquid detergent to be contained in the package bag is typically 5 to 50 mL, preferably 10 to 40 mL.

A known method may be used for packaging the liquid detergent with the PVA film of the present disclosure to produce the chemical agent package.

The chemical agent package of the present disclosure is produced, for example, by bonding two PVA films. One of the PVA films (bottom film) is fixed on a die disposed below a forming machine, and the other PVA film (top film) is fixed to an upper portion of the forming machine. The bottom film is heated by a dryer, and vacuum-formed on the die. Then, the liquid detergent is put on the formed film, and the top film is press-bonded to the bottom film. After the press bonding, the resulting package is released from the vacuum.

Examples of the film press-bonding method include: (1) heat sealing method; (2) water sealing method; and (3) adhesive sealing method, among which the water sealing method (2) is versatile and advantageous.

The liquid detergent preferably has a pH of 6 to 12, particularly preferably 7 to 11, when being dissolved or dispersed in water. The liquid detergent preferably has a water content of not higher than 15 wt. %, particularly preferably 0.1 to 10 wt. %, more preferably 0.1 to 7 wt. %.

In this case, the PVA film is highly soluble in water without gelation and insolubilization. The viscosity of the liquid chemical agent is not particularly limited, as long as the liquid chemical agent is fluid and conformable to the shape of the package. The viscosity of the liquid chemical agent is preferably 10 to 20 mPa·s.

The pH is measured in conformity with JIS K3362 8.3, and the water content is measured in conformity with JIS K3362 7.21.3. The viscosity is measured at an ordinary temperature by means of a B-type rotary viscometer.

EXAMPLES

The embodiments of the present disclosure will hereinafter be described more specifically by way of examples thereof. However, it should be understood that the present disclosure be not limited to the examples within the scope of the present disclosure. In the following examples, "parts" and "%" are based on weight.

Example 1-1

First, 100 parts of a carboxyl-modified PVA (A1) having a 4 wt. % aqueous solution viscosity of 22 mPa·s as measured at 20° C., an average saponification degree of 94 mol %, and a monomethyl maleate modification degree of 2.0 mol % as the PVA resin (A), 20 parts of sorbitol (C1) and 20 parts of glycerin (C2) as the plasticizer (C), 8 parts of starch (D1) having an average particle diameter of 20 μm as the filler (D), 0.2 parts of a polyoxyalkylene alkyl ether phosphate monoethanolamine salt as the surfactant (E), and 525 parts of water were mixed together, and stirred at 90° C. for 90 minutes. Thus, the modified PVA resin (A) was dissolved in water, whereby a PVA resin aqueous solution having a solid concentration of 22% was prepared.

After the temperature of the PVA resin aqueous solution was adjusted at 80° C., 0.15 parts of a diacetin agent (an ester of acetic acid (as the fatty acid (b1)) and glycerin (as the polyhydric alcohol (b2)) available from Tokyo Chemical Industry Co., Ltd., and having a purity of 41.5%) (a diacetin amount of 0.062 parts) as the polyhydric alcohol-lower fatty acid ester (B) was added to the PVA resin aqueous solution, and the resulting mixture was stirred for 30 minutes by means of a stirrer (MIX-ROTAR MR-available from As One Corporation). Thus, a film formation material was prepared.

Then, the film formation material prepared by mixing diacetin with the PVA resin aqueous solution with stirring was heated to 80° C. and allowed to stand still for 30 minutes. Thereafter, the film formation material was cast on a metal plate having a chromium-plated surface conditioned at a surface temperature of 85° C. by means of an applicator having a gap of 740 μm. After the cast film formation material was dried on the metal plate conditioned at a temperature of 85° C. for 7 minutes and 30 seconds, the resulting dry film was peeled off from the metal plate at a rate of 25 mm/second. Thus, a PVA film having a length of 20 cm, a width of 15 cm, a thickness of 85 μm, and water content of 5.8 wt. % was produced.

Example 1-2

A PVA film was produced in substantially the same manner as in Example 1-1, except that the amount of the diacetin agent was changed to 1 part (a diacetin amount of 0.415 parts).

Comparative Example 1-1

A PVA film was produced in substantially the same manner as in Example 1-1, except that the diacetin agent was not added.

Comparative Example 1-2

A PVA film was produced in substantially the same manner as in Example 1-1, except that the amount of the diacetin agent was changed to 5 parts (a diacetin amount of 2.1 parts).

Example 2-1

First, 90 parts of a carboxyl-modified PVA (A1) having a 4 wt. % aqueous solution viscosity of 22 mPa·s as measured at 20° C., an average saponification degree of 94 mol %, and a monomethyl maleate modification degree of 2.0 mol % and 10 parts of an unmodified PVA (A2) having a 4 wt. % aqueous solution viscosity of 18 mPa·s as measured at 20° C. and an average saponification degree of 88 mol % as the PVA resin (A), 20 parts of sorbitol (C1) and 20 parts of glycerin (C2) as the plasticizer (C), 8 parts of starch (D1) having an average particle diameter of 20 μm as the filler (D), 0.2 parts of a polyoxyalkylene alkyl ether phosphate monoethanolamine salt as the surfactant (E), and 525 parts of water were mixed together, and stirred at 90° C. for 90 minutes, whereby the PVA resin composition was dissolved in water. Thus, a PVA resin aqueous solution having a solid concentration of 22% was prepared.

After the temperature of the PVA resin aqueous solution was adjusted at 80° C., 0.15 parts of a diacetin agent (an ester of acetic acid (as the fatty acid (b1)) and glycerin (as the polyhydric alcohol (b2)) available from Tokyo Chemical Industry Co., Ltd., and having a purity of 41.5%) (a diacetin amount of 0.062 parts) as the polyhydric alcohol-lower fatty acid ester (B) was added to the PVA resin aqueous solution, and the resulting mixture was stirred for 30 minutes by means of a stirrer (MIX-ROTAR MR-available from As One Corporation). Thus, a film formation material was prepared.

Then, the film formation material prepared by mixing diacetin with the PVA resin aqueous solution with stirring was heated to 80° C. and allowed to stand still for 30 minutes. Thereafter, the film formation material was cast on a metal plate having a chromium-plated surface conditioned at a surface temperature of 85° C. by means of an applicator having a gap of 740 μm. After the cast film formation material was dried on the metal plate conditioned at a temperature of 85° C. for 7 minutes and 30 seconds, the resulting dry film was peeled off from the metal plate at a rate of 25 mm/second. Thus, a PVA film having a length of 20 cm, a width of 15 cm, a thickness of 85 μm, and water content of 5.8 wt. % was produced.

Example 2-2

A PVA film was produced in substantially the same manner as in Example 2-1, except that the amount of the diacetin agent was changed to 1 part (a diacetin amount of 0.415 parts).

Comparative Example 2-1

A PVA film was produced in substantially the same manner as in Example 2-1, except that the diacetin agent was not added.

Comparative Example 2-2

A PVA film was produced in substantially the same manner as in Example 2-1, except that the amount of the diacetin agent was changed to 5 parts (a diacetin amount of 2.1 parts).

The PVA films produced in Examples 1-1, 1-2, 2-1, 2-2 and Comparative Examples 1-1, 1-2, 2-1, 2-2 were each evaluated by measuring the amount of the polyhydric alcohol-lower fatty acid ester (B) (diacetin), the amount of the plasticizer (C), and the physical properties of the film by the following methods. The results are shown below in Tables 1 to 4.

[Amount of Polyhydric Alcohol-Lower Fatty Acid Ester (B)]
(Measurement Method)

The amount of the polyhydric alcohol-lower fatty acid ester (B) contained in the PVA film was measured under the following conditions by means of a GC/MS apparatus including a dynamic head space device.

<Dynamic Head Space Conditions>
Thermal desorption system: TDS-3 (available from Gerstel Corporation)
Sample amount: about 5 mg
Heating conditions: at 120° C. for 30 minutes <GC/MS Measurement Conditions>
GC device: Agilent 7890GC (available from Agilent Technologies Ltd.)
Column: DB-WAX (crosslinked PEG capillary column)
Column temperature: maintained at 40° C. for 5 minutes, then elevated to 250° C. at 10° C./minute, and maintained at 250° C. for 10 minutes
Inlet temperature: maintained at −150° C. (for trapping), and then at 250° C.
Carrier gas: helium
Column flow rate: 1.0 mL/minute
Split ratio: 1/30
MS device: Agilent 5977MSD (available from Agilent Technologies Ltd.)
Mode: SCAN mode

[Amount of Plasticizer (C)]
(Measurement Method)

A 1 g test sample was cut out of the produced PVA film, and treated with 100 mL of methanol solvent for 6 hours by means of a Soxhlet extractor, whereby the plasticizer was extracted. The resulting extraction liquid was concentrated by an evaporator, and the concentrated liquid was diluted to a volume of 10 mL in a measurement flask. Then, 10 μL of the resulting liquid was mixed with 400 μL of a trimethylsilylation agent (N-methyl-N-trimethylsilyl trifluoroacetamide (MSTFA)), and the resulting mixture was heated (to 60° C.), whereby the plasticizer was converted to a trimethylsilyl derivative. In turn, 1 μL of the resulting liquid was analyzed by the gas chromatograph/mass spectrometer (GC/MS), whereby the weight of the plasticizer was determined. Based on the weight thus determined, the amount (wt. %) of the plasticizer contained in the 1 g film was calculated.

[Water Content of PVA Film]
(Evaluation Method)

A sample having a size of 5 cm×5 cm for measurement of the water content was cut out of a widthwise middle portion of the produced PVA film. The weight (W) of the film sample thus cut out was measured by means of an electronic balance. Then, the film sample was immersed in 15 mL (S) of methanol dehydrated to a water content of not higher than 0.03%, and water was extracted from the film sample at a room temperature for one hour. The amount of water contained in 10 mL (E) of the resulting extraction liquid was measured by a volumetric titration method by means of a Karl Fischer moisture analyzer (MKA-610 available from Kyoto Electronics Manufacturing Co., Ltd.), and the water content (wt. %) of the film was calculated from the following expression:

$$x(\text{wt. \%}) = \frac{F(V-B)}{W \times (E/S) \times 1000} \times 100$$

F: Titer (mg/mL) of Karl Fischer agent
V: Amount (mL) of Karl Fischer agent used for titration of 10 mL of extraction liquid
B: Amount (mL) of Karl Fischer agent used for titration of 10 mL of dehydrated methanol
W: Weight (g) of 5 cm×5 cm film sample
E: Amount (mL) of extraction liquid used for Karl Fischer measurement
S: Amount (mL) of dehydrated methanol used for extraction of water contained in film sample

[Transparency of PVA film: Internal Haze]
(Measurement Method)

The produced PVA film was analyzed in conformity with JIS K7136 by means of a haze meter NDH4000 (available from Nippon Denshoku Industries Co., Ltd.) A value obtained by analyzing a surface state of the film after paraffin oil was applied to front and back surfaces of the film was defined as an internal haze.

[Antistatic Property of PVA Film: Surface Resistivity]
(Measurement Method)

A sample having a length of 10 cm and a width of 10 cm was cut out of the produced PVA film, and allowed to stand still at 23° C. at 50% RH for three days. Then, the surface resistivity (Ω/□) of the PVA film was measured by means of HIRESTA-UP MCP-HT450 available from Mitsubishi Chemical Analytech Co., Ltd. A lower surface resistivity means that the antistatic property is more excellent.

[Cold-Water Solubility]

A sample having a size of 3 cm×5 cm was cut out of the produced PVA film, and fixed to a jig. Next, 1 L of water was put in a 1-L beaker. While the water was stirred at a rotation speed of 750 rpm by a stirrer (having a rotor length of 3 cm) with the temperature thereof kept at 5° C., the PVA film sample fixed to the jig was immersed in the water, and time (second) required for dissolution of the film sample in water was measured. The term "dissolution" herein means that dispersion of undissolved particles having a diameter of 1 mm or more was not observed.

[Peel Strength of Water-Sealed Portion]

After the produced PVA film was moisture-conditioned at 23° C. at 50% RH for 24 hours, a 50 mm×50 mm square PVA film (1) was cut out of a widthwise middle portion of the produced PVA film with one edge thereof being parallel to an MD direction (machine direction). Further, a rectangular PVA film (2) having a length of 70 mm as measured parallel to the MD direction (machine direction) and a width of 15 mm as measured parallel to a TD direction (transverse direction) was cut out of a widthwise middle portion of the produced PVA film.

(Measurement of Peel Strength)

The 50 mm×50 mm PVA film (1) was put on a 30-cm square glass plate, and a PVA sponge roller (SIGNAS Roller available from Aion Co., Ltd.) sufficiently impregnated with water (having a total weight of 110 g) was rolled over the PVA film (1) to wet the PVA film (1). Thereafter, the 15 mm×70 mm PVA film (2) was put on the wetted PVA film (1), and a rubber roller (having a width of 250 mm, a diameter of 60 mm, and a weight of 2,750 g) was rolled over the PVA films (1) and (2) twice, whereby the two PVA films (1) and (2) were bonded together.

After the resulting PVA films (1) and (2) were allowed to stand still for one minute, the lower PVA film (1) was fixed to a glass substrate, and a spring balance was attached to an end surface of the upper PVA film (2) and pulled upward at a rate of 10 cm/second. Thus, the peel strength (g/15 mm) was measured. The measurement was performed in an environment at 23° C. at 50% RH.

TABLE 1

|  | Example 1-1 | Example 1-2 | Comparative Example 1-1 | Comparative Example 1-2 |
| --- | --- | --- | --- | --- |
| Polyhydric alcohol-lower fatty acid ester (B) (ppm) | 270 | 1,200 | 0 | 5,000 |
| Plasticizer (C) (ppm) | $2.6 \times 10^5$ | $2.6 \times 10^5$ | $2.6 \times 10^5$ | $2.6 \times 10^5$ |
| Polyhydric alcohol-lower fatty acid ester (B)/Plasticizer (C) | 0.0010 | 0.0046 | 0 | 0.019 |
| Transparency [Internal haze] | 5.9 | 6.4 | 6.6 | 7.0 |
| Antistatic property [Surface resistivity (Ω/□)] | $5.3 \times 10^7$ | $4.5 \times 10^7$ | $7.5 \times 10^7$ | $3.7 \times 10^7$ |

TABLE 2

|  | Example 1-1 | Example 1-2 | Comparative Example 1-1 | Comparative Example 1-2 |
| --- | --- | --- | --- | --- |
| Cold-water solubility time [Dissolution time (second)] | 113 | 113 | 113 | 115 |

TABLE 3

|  | Example 2-1 | Example 2-2 | Comparative Example 2-1 | Comparative Example 2-2 |
| --- | --- | --- | --- | --- |
| Polyhydric alcohol-lower fatty acid ester (B) (ppm) | 270 | 1,200 | 0 | 5,000 |
| Plasticizer (C) (ppm) | $2.6 \times 10^5$ | $2.6 \times 10^5$ | $2.6 \times 10^5$ | $2.6 \times 10^5$ |
| Polyhydric alcohol-lower fatty acid ester (B)/Plasticizer (C) | 0.0010 | 0.0046 | 0 | 0.019 |
| Transparency [Internal haze] | 5.5 | 6.0 | 6.7 | 7.5 |
| Antistatic property [Surface resistivity (Ω/□)] | $7.2 \times 10^7$ | $5.5 \times 10^7$ | $8.7 \times 10^7$ | $4.4 \times 10^7$ |

TABLE 4

|  | Example 2-1 | Example 2-2 | Comparative Example 2-1 | Comparative Example 2-2 |
| --- | --- | --- | --- | --- |
| Cold-water solubility [Dissolution time (second)] | 98 | 98 | 98 | 100 |
| Peel strength of water-sealed portion [peel strength (g/15 mm)] | 140 | 140 | 140 | 130 |

The results shown in Table 1 indicate that the PVA films of Examples 1-1 and 1-2 each containing a predetermined very small amount of the polyhydric alcohol-lower fatty acid ester (B) were highly transparent, and excellent in antistatic property.

On the other hand, the PVA film of Comparative Example 1-1 in which the polyhydric alcohol-lower fatty acid ester (B) was not contained had a higher internal haze and hence a lower transparency than in Examples 1-1 and 1-2. The PVA film of Comparative Example 1-2 in which the polyhydric alcohol-lower fatty acid ester (B) was contained in a greater amount had an improved antistatic property, but had a higher internal haze than in Examples 1-1 and 1-2. Therefore, Comparative Example 1-2 failed to provide the transparency-improving effect.

The results shown in Table 2 indicate that the PVA films of Examples 1-1 and 1-2 and Comparative Examples 1-1 and 1-2 were dissolved in cold water at 5° C. in a short period of time, i.e., within two minutes and, therefore, are suitable for liquid detergent package applications requiring the cold-water solubility.

That is, the results shown in Tables 1 and 2 indicate that, where the polyhydric alcohol-lower fatty acid ester (B) is contained in a specific very small amount in the PVA film containing the modified polyvinyl alcohol resin, the transparency, the antistatic property, and the cold-water solubility of the PVA film are properly balanced.

The results shown in Table 3 indicate that the PVA films of Examples 2-1 and 2-2 each containing a specific very small amount of the polyhydric alcohol-lower fatty acid ester (B) had a higher transparency and an excellent antistatic property.

On the other hand, the PVA film of Comparative Example 2-1 in which the polyhydric alcohol-lower fatty acid ester (B) was not contained had a higher internal haze and hence a lower transparency than in Examples 2-1 and 2-2. The PVA film of Comparative Example 2-2 in which the polyhydric alcohol-lower fatty acid ester (B) was contained in a greater amount had an improved antistatic property, but had a higher internal haze than in Examples 2-1 and 2-2. Therefore, Comparative Example 2-2 failed to provide the transparency-improving effect.

Further, the results shown in Table 4 indicate that the PVA films of Examples 2-1 and 2-2 and Comparative Examples 2-1 and 2-2 were dissolved in cold water at 5° C. in a very short period of time, i.e., within two minutes and, therefore, are suitable for liquid detergent package applications requiring the cold-water solubility. Further, the results shown in Table 4 indicate that, in Examples 2-1 and 2-2, the water-sealed portions each have a higher peel strength and, therefore, the PVA films are particularly suitable for the liquid detergent package applications.

That is, the results shown in Tables 3 and 4 indicate that, where the polyhydric alcohol-lower fatty acid ester (B) is contained in a specific very small amount in the PVA film containing the two or more types of PVA resins, the transparency, the antistatic property, the cold-water solubility, and the sealability of the PVA film are properly balanced.

As shown in Tables 1 and 3, the amounts of the polyhydric alcohol-lower fatty acid ester (B) contained in the PVA films are measured values, which may be different from the fed amounts. It is supposed that this difference is attributable to migration of the polyhydric alcohol-lower fatty acid ester (B) to the metal surface on which the film formation material was cast.

While specific forms of the embodiments of the present disclosure have been shown in the aforementioned examples, the examples are merely illustrative but not limitative. It is contemplated that various modifications apparent to those skilled in the art could be made within the scope of the disclosure.

The PVA film of the present disclosure is highly transparent and excellent in antistatic property. Therefore, the PVA film is useful for polarization film applications requiring higher optical properties (for liquid crystal TVs, smartphones, tablet computers, personal computers, projectors, onboard panels, and the like), and for water-soluble film applications (unit packaging applications for chemical agents such as agricultural chemicals and detergents, (water pressure) transfer films, sanitary supplies such as sanitary napkins and disposable diapers, waste disposal supplies such as ostomy bags, medical supplies such as blood-absorbing sheets, and temporary base materials for seeding sheets, seeding tapes, and embroidery bases).

Particularly, the PVA film of the present disclosure is excellent in design feasibility because of its higher transparency, excellent antistatic property and, hence, excellent printability. The PVA film is also excellent in cold-water solubility and, therefore, is useful for individual packaging applications for packaging chemical agents (chemical agent packages).

The invention claimed is:

1. A polyvinyl alcohol film comprising:
   (A) not less than 50 wt % of a polyvinyl alcohol resin relative to the total weight of the film, the polyvinyl alcohol resin comprising a carboxyl-modified polyvinyl alcohol having a saponification degree of 85 to 99.9 mol %;
   (B) an ester of a C2 to C4 fatty acid (b1) and a polyhydric alcohol (b2); and
   (C) a plasticizer;
      wherein the ester (B) is present in an amount of 1 to 4,000 ppm,
      wherein the ester (B) and the plasticizer (C) are present in a weight ratio (B)/(C) of 0.00001 to 0.005,
      wherein the plasticizer (C) is at least one selected from the group consisting of salicyl alcohol, catechol, resorcinol, hydroquinone, bisphenol-A, bisphenol-F, neopentyl glycol, phloroglucinol, erythritol, threitol, pentaerythritol, xylitol, arabitol, fucitol, glucose, fructose, mannitol, sorbitol, inositol, lactitol, sucrose, trehalose, maltitol, ethylene glycol, diethylene glycol, triethylene glycol, propylene glycol, tetraethylene glycol, 1,3-propanediol, 1,4-butanediol, 1,6-hexanediol, tripropylene glycol, polyethylene glycols having a molecular weight of not greater than 2,000, glycerin, diglycerin, triethanolamine, trimethylolpropane, diethylene glycol monomethyl ether, cyclohexanol, carbitol, polypropylene glycol, dibutyl ether, stearic acid, oleic acid, linoleic acid, linolenic acid, sorbic acid, citric acid, adipic acid, cyclohexanone, monoethanolamine, triethanolamine, ethylenediamine, imidazole compounds, alanine, glycine, aspartic acid, glutamic acid, histidine, lysine, and cysteine,
      wherein the polyhydric alcohol (b2) is a C2 to C6 polyhydric alcohol, and
      wherein the film exhibits a dissolution time of 120 seconds or less in water at a temperature of 5° C.

2. The polyvinyl alcohol film according to claim 1, wherein the polyvinyl alcohol resin (A) comprises two or more polyvinyl alcohols which are different in at least one selected from the group consisting of saponification degree, viscosity, modifying group, and modification degree.

3. The polyvinyl alcohol film according to claim 2, wherein the two or more polyvinyl alcohols comprise an unmodified polyvinyl alcohol and the carboxyl-modified polyvinyl alcohol.

4. The polyvinyl alcohol film according to claim 3, wherein the unmodified polyvinyl alcohol and the carboxyl-modified polyvinyl alcohol are present in a weight ratio of (unmodified polyvinyl alcohol)/(carboxyl-modified polyvinyl alcohol)=1/99 to 99/1.

5. The polyvinyl alcohol film according to claim 1, wherein the ester (B) is an acetic acid ester of glycerin.

6. A chemical agent package comprising:
   a package bag formed from the polyvinyl alcohol film according to claim 1; and
   a chemical agent packaged in the package bag.

7. The chemical agent package according to claim 6, wherein the chemical agent is a detergent.

8. The chemical agent package according to claim 7, wherein the detergent is a liquid detergent.

9. A method of producing the chemical agent package according to claim 6, comprising packaging the chemical agent in the polyvinyl alcohol film.

10. The polyvinyl alcohol film according to claim 1, wherein the ester (B) is present in an amount of 1 to 1,500 ppm.

11. A polyvinyl alcohol film comprising:
   (A) not less than 50 wt % of a polyvinyl alcohol resin relative to the total weight of the film, the polyvinyl alcohol resin comprising a carboxyl-modified polyvinyl alcohol having a saponification degree of 85 to 99.9 mol %;
   (B) as ester of a C2 to C4 fatty acid (b1) and a polyhydric alcohol (b2);
   (C) a plasticizer;
   (D) 1 to 30 parts by weight relative to 100 parts by weight of the polyvinyl alcohol resin of a filler comprising starch particles having an average particle size $D_{50}$ of from 15 to 35 μm; and
   (E) 0.1 to 3 parts by weight relative to 100 parts by weight of the polyvinyl alcohol resin of a surfactant selected from the group consisting of a polyoxyethylene alkyl allyl ether, polyoxyethylene sorbitan monolaurate, polyoxyethylene sorbitan monopalmitate, polyoxyethylene sorbitan monostearate, polyoxyethylene sorbitan monooleate, a polyoxyalkylene alkyl ether phosphate monoethanolamine salt, and a polyoxyethylene alkylamino ether;

wherein the ester (B) is present in an amount of 1 to 1,500 ppm, wherein the ester (B) and the plasticizer (C) are present in a weight ratio of (B)/(C) of 0.00001 to 0.005, wherein the plasticizer (C) is a combination of glycerin and one selected from the group consisting of sorbitol, sucrose, and trehalose wherein the plasticizer (C) is present in an amount of 5 to 70 parts by weight relative to 100 parts by weight of the polyvinyl alcohol resin, and wherein the polyhydric alcohol (b2) is a C2 to C6 polyhydric alcohol.

12. The polyvinyl alcohol film according to claim 11, which is a water-soluble film.

* * * * *